United States Patent
Inoue et al.

(10) Patent No.: US 11,021,049 B2
(45) Date of Patent: Jun. 1, 2021

(54) ACTIVE NOISE VIBRATION CONTROL APPARATUS AND METHOD FOR MANUFACTURING SAME

(71) Applicants: HONDA MOTOR CO., LTD., Tokyo (JP); NATIONAL UNIVERSITY CORPORATION KANAZAWA UNIVERSITY, Kanazawa (JP)

(72) Inventors: Toshio Inoue, Saitama (JP); Osamu Terashima, Saitama (JP); Toshihiko Komatsuzaki, Kanazawa (JP)

(73) Assignees: HONDA MOTOR CO., LTD., Tokyo (JP); NATIONAL UNIVERSITY CORPORATION KANAZAWA UNIVERSITY, Kanazawa (JP)

( * ) Notice: Subject to any disclaimer, the term of this patent is extended or adjusted under 35 U.S.C. 154(b) by 260 days.

(21) Appl. No.: 16/314,705

(22) PCT Filed: Jun. 23, 2017

(86) PCT No.: PCT/JP2017/023130
§ 371 (c)(1),
(2) Date: Jan. 2, 2019

(87) PCT Pub. No.: WO2018/008425
PCT Pub. Date: Jan. 11, 2018

(65) Prior Publication Data
US 2019/0315219 A1    Oct. 17, 2019

(30) Foreign Application Priority Data
Jul. 5, 2016    (JP) .............................. JP2016-132996

(51) Int. Cl.
*F16F 1/36*    (2006.01)
*B60K 5/12*    (2006.01)
(Continued)

(52) U.S. Cl.
CPC ...... *B60K 5/1283* (2013.01); *B29C 45/14491* (2013.01); *B60K 5/1208* (2013.01);
(Continued)

(58) Field of Classification Search
CPC ........ F16F 1/361; F16F 1/3615; F16F 1/3842; F16F 1/387; F16F 7/1011; F16F 15/03;
(Continued)

(56) References Cited

U.S. PATENT DOCUMENTS 5,609,353 A * 3/1997 Watson ................ B60G 17/015
188/267
5,814,999 A    9/1998 Elie et al.
(Continued)

FOREIGN PATENT DOCUMENTS

JP    4-107334 A    4/1992
JP    2002106633 A    4/2002
(Continued)

OTHER PUBLICATIONS

International Search Report dated Sep. 19, 2017, issued in counterpart application No. PCT/JP2017/023130 (2 pages).
(Continued)

*Primary Examiner* — Thomas W Irvin
(74) *Attorney, Agent, or Firm* — Westerman, Hattori, Daniels & Adrian, LLP

(57) ABSTRACT

An engine mount control apparatus that is an active noise vibration control apparatus according to the present disclosure is characterized by being provided with a housing that has an outer core, an inner core that is disposed inside the outer core, and an electromagnetic coil that is positioned between the outer core and the inner core and by a portion between the outer core and the inner core being filled with a magneto-rheological elastomer containing magnetic par-
(Continued)

ticles. The present disclosure enables the maintenance of good static load support performance.

9 Claims, 7 Drawing Sheets

(51) Int. Cl.
| | | |
|---|---|---|
| *B29C 45/14* | (2006.01) | |
| *F16F 1/38* | (2006.01) | |
| *F16F 1/387* | (2006.01) | |
| *F16F 13/04* | (2006.01) | |
| *F16F 15/02* | (2006.01) | |
| *F16F 15/03* | (2006.01) | |
| *B29K 21/00* | (2006.01) | |
| *B29L 31/00* | (2006.01) | |

(52) U.S. Cl.
CPC ............ *F16F 1/361* (2013.01); *F16F 1/3615* (2013.01); *F16F 1/387* (2013.01); *F16F 1/3842* (2013.01); *F16F 13/04* (2013.01); *F16F 15/022* (2013.01); *F16F 15/03* (2013.01); *B29K 2021/00* (2013.01); *B29K 2995/0008* (2013.01); *B29L 2031/721* (2013.01); *F16F 2222/06* (2013.01); *F16F 2224/025* (2013.01); *F16F 2226/04* (2013.01); *F16F 2228/066* (2013.01)

(58) Field of Classification Search
CPC .......... F16F 2222/06; F16F 2224/025; F16F 2226/04; F16F 2228/066; B60K 5/1283; B29C 45/14491
See application file for complete search history.

(56) References Cited

U.S. PATENT DOCUMENTS

| | | | | | |
|---|---|---|---|---|---|
| 7,086,507 | B2* | 8/2006 | Hitchcock | ............... | F16F 1/361 |
| | | | | | 188/267.2 |
| 7,261,834 | B2* | 8/2007 | Fuchs | ............ | F16F 1/3605 |
| | | | | | 252/62.53 |
| 9,581,214 | B2* | 2/2017 | Sun | ........... | H01F 1/447 |
| 9,610,714 | B2* | 4/2017 | Davydov | ............. | B01D 39/12 |
| 9,616,727 | B2* | 4/2017 | Ogawa | ............. | B60G 11/22 |
| 9,835,218 | B2* | 12/2017 | Inoue | ............ | F16F 7/1011 |
| 10,161,467 | B2* | 12/2018 | Terashima | ............ | F16F 15/03 |
| 10,267,373 | B2* | 4/2019 | Inoue | ........... | F16F 7/116 |
| 10,400,841 | B2* | 9/2019 | Inoue | ............ | F16F 15/03 |
| 10,630,158 | B2* | 4/2020 | Terashima | ............ | H02K 33/02 |
| 2002/0036372 | A1 | 3/2002 | Goto et al. | | |
| 2005/0116194 | A1* | 6/2005 | Fuchs | ............ | F16F 1/3615 |
| | | | | | 252/62.54 |
| 2013/0127093 | A1 | 5/2013 | Luzenski et al. | | |
| 2014/0376837 | A1* | 12/2014 | Sun | .......... | F16F 1/361 |
| | | | | | 384/8 |
| 2015/0343677 | A1* | 12/2015 | Davydov | ............ | B21F 27/18 |
| | | | | | 264/266 |
| 2016/0152108 | A1 | 6/2016 | Ogawa et al. | | |
| 2016/0333957 | A1* | 11/2016 | Inoue | ............ | B60K 5/1208 |
| 2017/0219039 | A1* | 8/2017 | Inoue | ............ | F16F 7/1011 |
| 2018/0066723 | A1* | 3/2018 | Inoue | ............ | F16F 15/03 |
| 2018/0223936 | A1* | 8/2018 | Rumpel | ............ | F16F 1/3876 |
| 2019/0154098 | A1* | 5/2019 | Inoue | ............ | F16F 1/361 |
| 2019/0154108 | A1* | 5/2019 | Inoue | ............ | F16F 15/02 |
| 2019/0170206 | A1* | 6/2019 | Inoue | ............ | B62D 27/04 |

FOREIGN PATENT DOCUMENTS

| | | |
|---|---|---|
| JP | 2015-121254 A | 7/2015 |
| WO | 2012/026332 A1 | 3/2012 |
| WO | 2015/012351 A1 | 1/2015 |
| WO | 2015012351 A1 | 1/2015 |

OTHER PUBLICATIONS

Written Opinion in Japanese dated Sep. 19, 2017, issued in counterpart application No. PCT/JP2017/023130 (4 pages).
Office Action dated Oct. 1, 2019, issued in counterpart JP Application No. 2018-526031, with English translation (8 pages).
Written Opinion dated Dec. 2, 2019, issued in counterpart JP Application No. 2018-526031, with English translation (3 pages).
Decision to Grant a Patent dated Apr. 14, 2020, issued in counterpart JP Application No. 2018-526031, with English translation (5 pages).

* cited by examiner

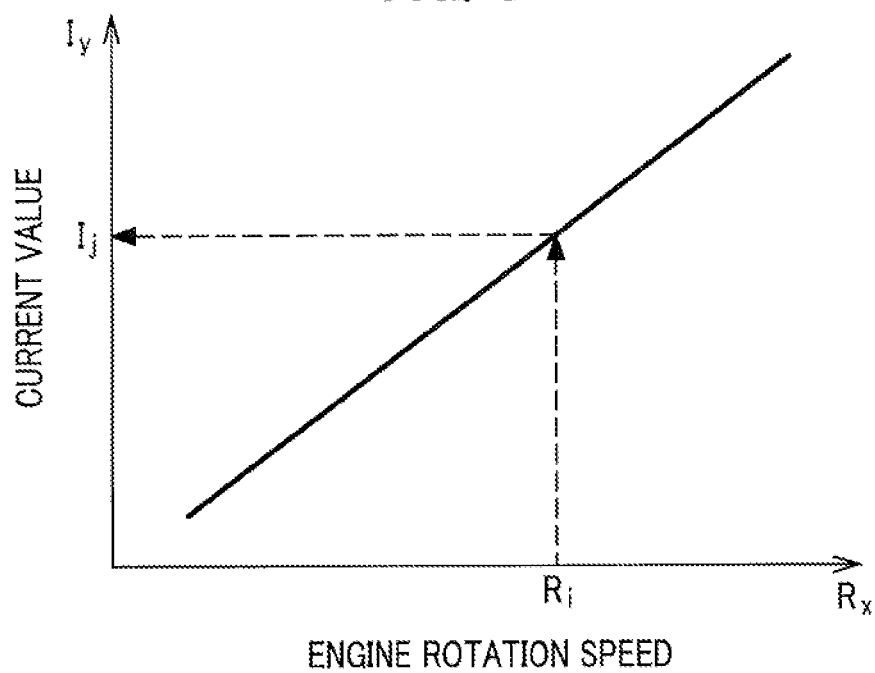
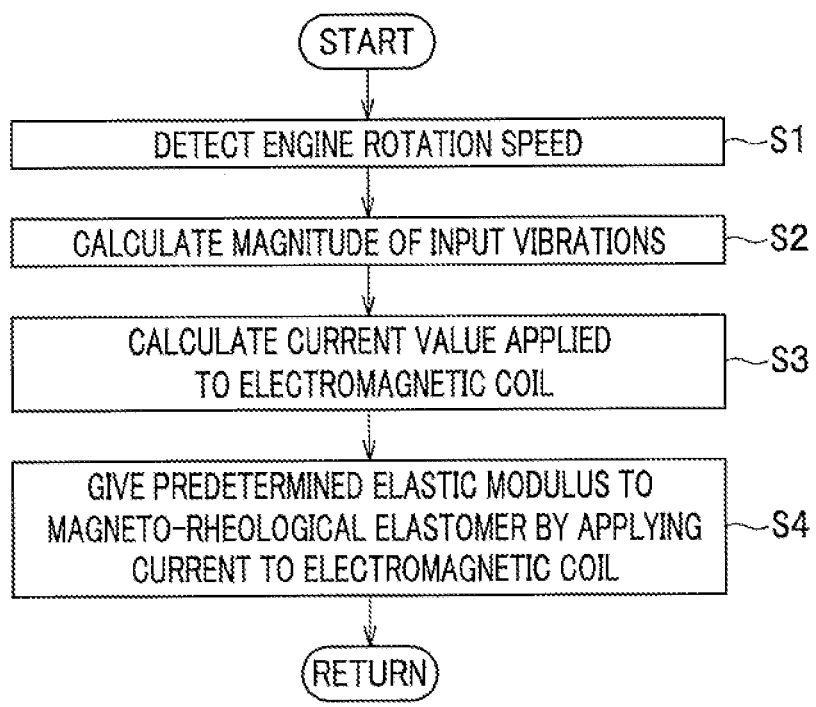

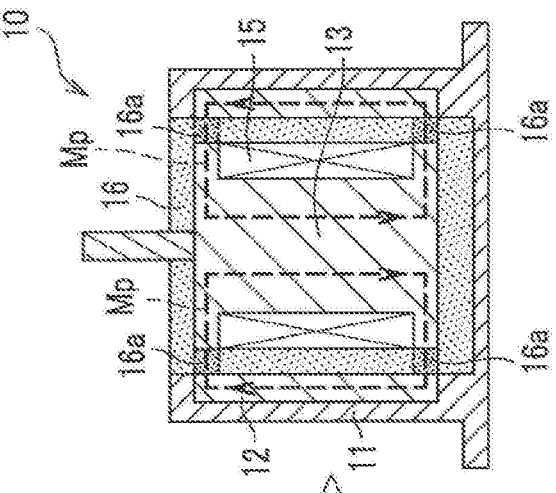
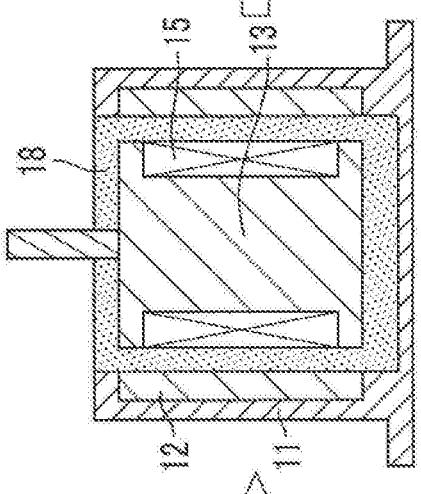
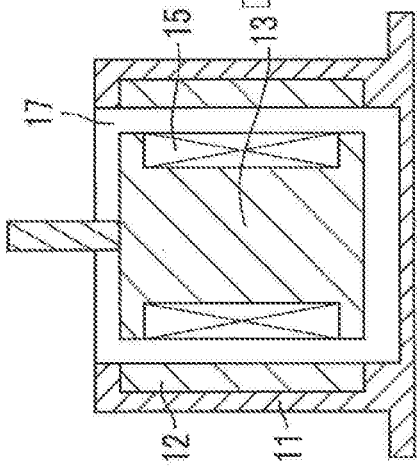

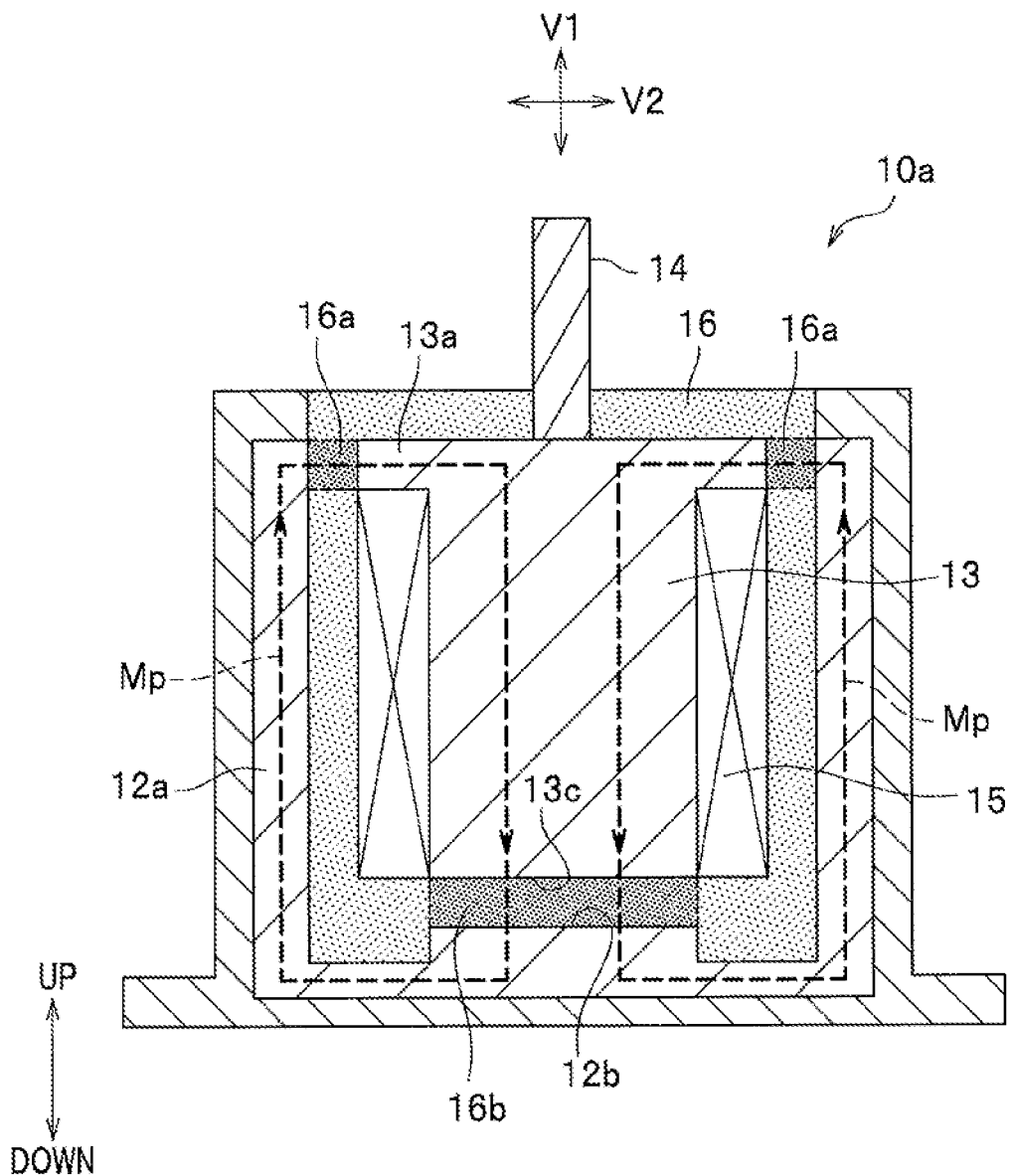

ACTIVE NOISE VIBRATION CONTROL APPARATUS AND METHOD FOR MANUFACTURING SAME

TECHNICAL FIELD

The present invention relates to an active noise vibration control apparatus and a method for manufacturing the apparatus.

BACKGROUND ART

Conventionally known is a magnetic response-type elastic device using a magneto-rheological elastomer (MRE) (see Patent Literature 1). This Patent Literature 1 discloses an actuator in which an apparent elastic modulus of the magneto-rheological elastomer changes depending on the strength of a magnetic field applied.

PRIOR ART

Patent Literature

Patent Literature 1: WO2012/026332

SUMMARY OF INVENTION

Technical Problem

Meanwhile, such a magnetic response-type elastic device may be used as an active noise vibration control apparatus. According to this active noise vibration control apparatus, an input part to which noise and vibrations are input is supported by the magneto-rheological elastomer and support rigidity of the input part can be changed depending on the magnitude of the noise and vibrations. This can markedly enhance a noise/vibration-proof effect.

In addition, in such an active noise vibration control apparatus, the magneto-rheological elastomer should have a large elastic changing rate in response to the strength of a magnetic field applied. According to this active noise vibration control apparatus, even if the magnitude of input noise and vibrations, etc., is largely changed, an excellent noise/vibration-proof effect depending on the magnitude of the noise and vibrations, etc. can be exerted.

To ensure the large elastic changing rate in the magneto-rheological elastomer as described above, it is necessary to keep low the hardness (rigidity) of a substrate elastomer (matrix) including magnetic particles, thereby increasing mobility of the magnetic particles in accordance with the strength of the magnetic field.

Unfortunately, this active noise vibration control apparatus has a decreased hardness (rigidity) of the magneto-rheological elastomer itself, so that static load support performance is insufficient.

Here, the present invention addresses the problem of providing an active noise vibration control apparatus and a method for manufacturing the apparatus such that the maintenance of good static load support performance is enabled while a large elastic changing rate in a magneto-rheological elastomer can be retained.

Solution to Problem

In order to solve the problem, an aspect of the present invention provides an active noise vibration control apparatus comprising: a housing that has an outer core; an inner core that is disposed inside the miter core; and an electromagnetic coil that is positioned between the outer core and the inner core, wherein a space between the outer core and the inner core is filled with a magneto rheological elastomer containing magnetic particles.

In this active noise vibration control apparatus, the space between the outer core and the inner core that are disposed in the housing is filled with the magneto rheological elastomer. This enables the active noise vibration control apparatus to maintain good static load support performance while a substrate elastomer having a reliably large elastic changing rate and a low hardness (rigidity) can be used therefor.

In addition, such an active noise vibration control apparatus may include a housing that has an outer core and is made of a material different from a material of the outer core; an inner core that is disposed inside the outer core; and an electromagnetic coil that is positioned between the outer core and the inner core, and be configured such that a content rate of the magnetic particles in a magnetic path-forming portion of the magneto-rheological elastomer between the outer core and the inner core is higher than a content rate of the magnetic particles in a portion other than the magnetic path-forming portion of the magneto-rheological elastomer.

Because the magnetic path-forming portion of the magneto-rheological elastomer in the active noise vibration control apparatus contains a larger number of the magnetic particles, this magnetic path-forming portion is given a locally larger rigidity when a magnetic field is formed by the electromagnetic coil. Accordingly, the active noise vibration control apparatus can exert an excellent noise/vibration-proof effect when the noise and vibrations, etc., are input.

In addition, a portion other than the magnetic path-forming portion of the magneto-rheological elastomer is inside the housing, thereby enabling the maintenance of good static load support performance in the active noise vibration control apparatus.

In addition, in a configuration of such an active noise vibration control apparatus, the electromagnetic coil may be disposed on the outer core side such that the electromagnetic coil is arranged apart from the inner core. In another configuration of such an active noise vibration control apparatus, the electromagnetic coil may be disposed on the inner core side such that the electromagnetic coil is arranged apart from the outer core.

According to these active noise vibration control apparatuses, the degree of design freedom is improved.

In addition, in order to solve the above problem, another aspect of the present invention provides a method for manufacturing an active noise vibration control apparatus, comprising:

an arrangement step of arranging an inner core inside an outer core of a housing having the outer core and arranging an electromagnetic coil between the outer core and the inner core;

an injection step of injecting a magnetic particle-containing uncured elastomer raw material into a separation space formed, inside the housing, between the outer core and the inner core; and a magneto-rheological-elastomer formation step of curing the elastomer raw material while forming a given magnetic path in the outer core, the inner core, and the injected elastomer raw material by applying a current to the electromagnetic coil.

According to this manufacturing method, an active noise vibration control apparatus having a large elastic changing rate in the magneto-rheological elastomer can be manufactured in simple steps.

Advantageous Effects of Invention

The present invention can provide an active noise vibration control apparatus and a method for manufacturing the apparatus such that the maintenance of good static load support performance is enabled while a large elastic changing rate in a magneto-rheological elastomer can be retained.

BRIEF DESCRIPTION OF DRAWINGS

FIG. 3 is a graph showing an example of a map stored in a memory of a control unit of the engine mount control apparatus.

FIG. 4 is a flowchart describing how the engine mount control apparatus works.

FIGS. 5A to 5C are diagrams illustrating the steps of a method for manufacturing the engine mount control apparatus FIG. 6 is a diagram illustrating the configuration of a mount according to a first modification embodiment.

DESCRIPTION OF EMBODIMENTS

The following describes embodiments of the present invention. An active noise vibration control apparatus of the present invention is mainly characterized in that a space between an outer core and an inner core which are arranged in a housing is filled with a magneto-rheological elastomer.

In this embodiment, an engine mount control apparatus is used as an example to specifically describe the active noise vibration control apparatus of the present invention.
(Engine Mount Control Apparatus)

Figure 1:
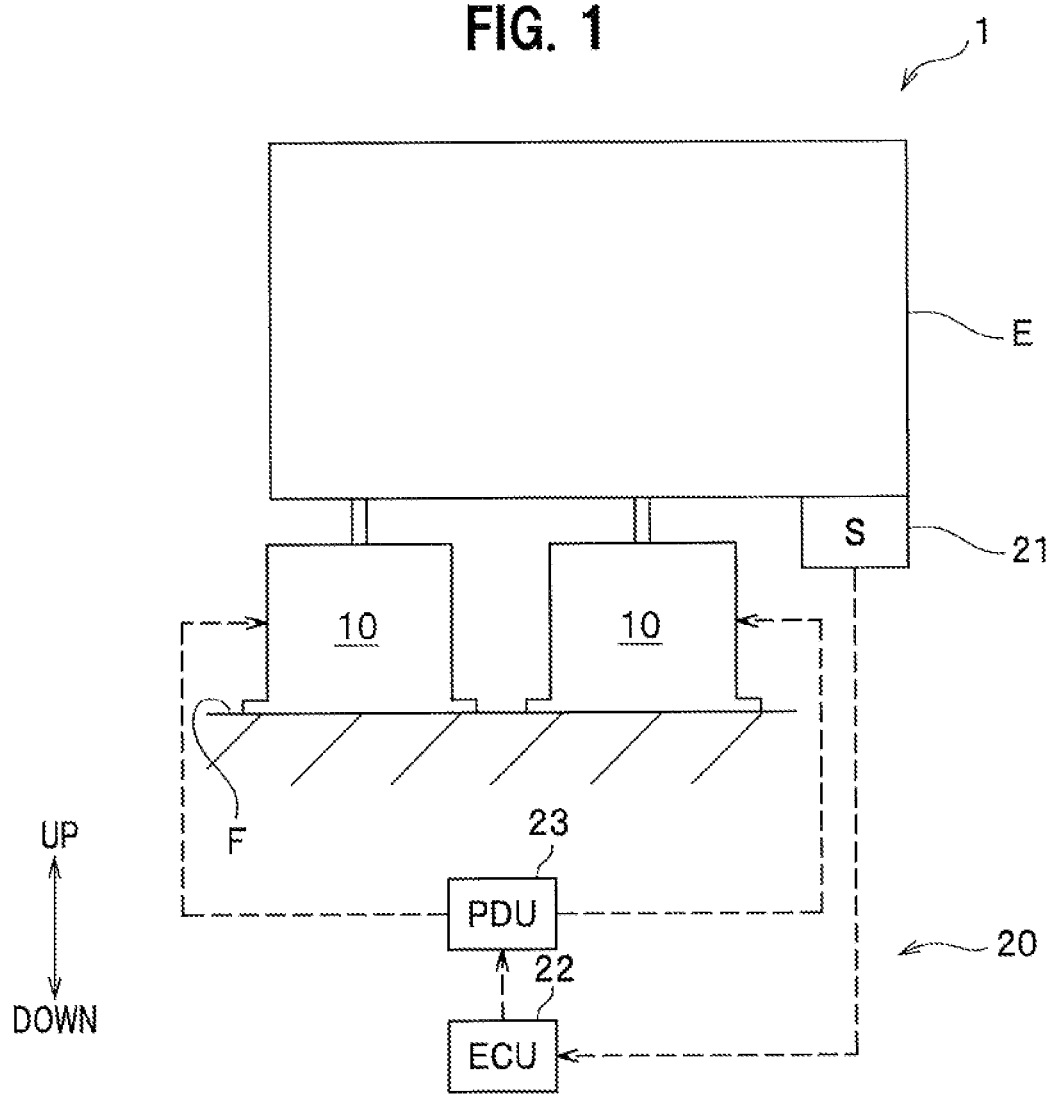
FIG. 1 is a diagram illustrating the configuration of an engine mount control apparatus (active noise vibration control apparatus) according to an embodiment of the present invention.

FIG. 1 is a diagram illustrating the configuration of an engine mount control apparatus 1 (active noise vibration control apparatus) according to this embodiment.

As shown in FIG. 1 the engine mount control apparatus 1 includes mounts 10 and a control unit 20 configured to control the magnitude of elastic modulus of the below-described magneto-rheological elastomer 16 (see FIG. 2), which is a component of each mount 10. This engine mount control apparatus 1 can prevent engine E vibrations from being transmitted via a vehicle body to a driver and can prevent engine E noise by preventing the vibrations.

A pair of mounts 10 of this embodiment is arranged below the engine E, which is a vibration source. Specifically, the below-described shaft member 14 of each mount 10 is supported on the engine E side and a lower portion of the below-described housing 11 (see FIG. 2) for the mount 10 is supported on the vehicle body frame F side.

Note that the control unit 20 including an engine rotation speed sensor 21, an ECU (Electronic Control Unit) 22, and a PDU (Power Drive Unit) 23 is described in detail later.

Figure 2:
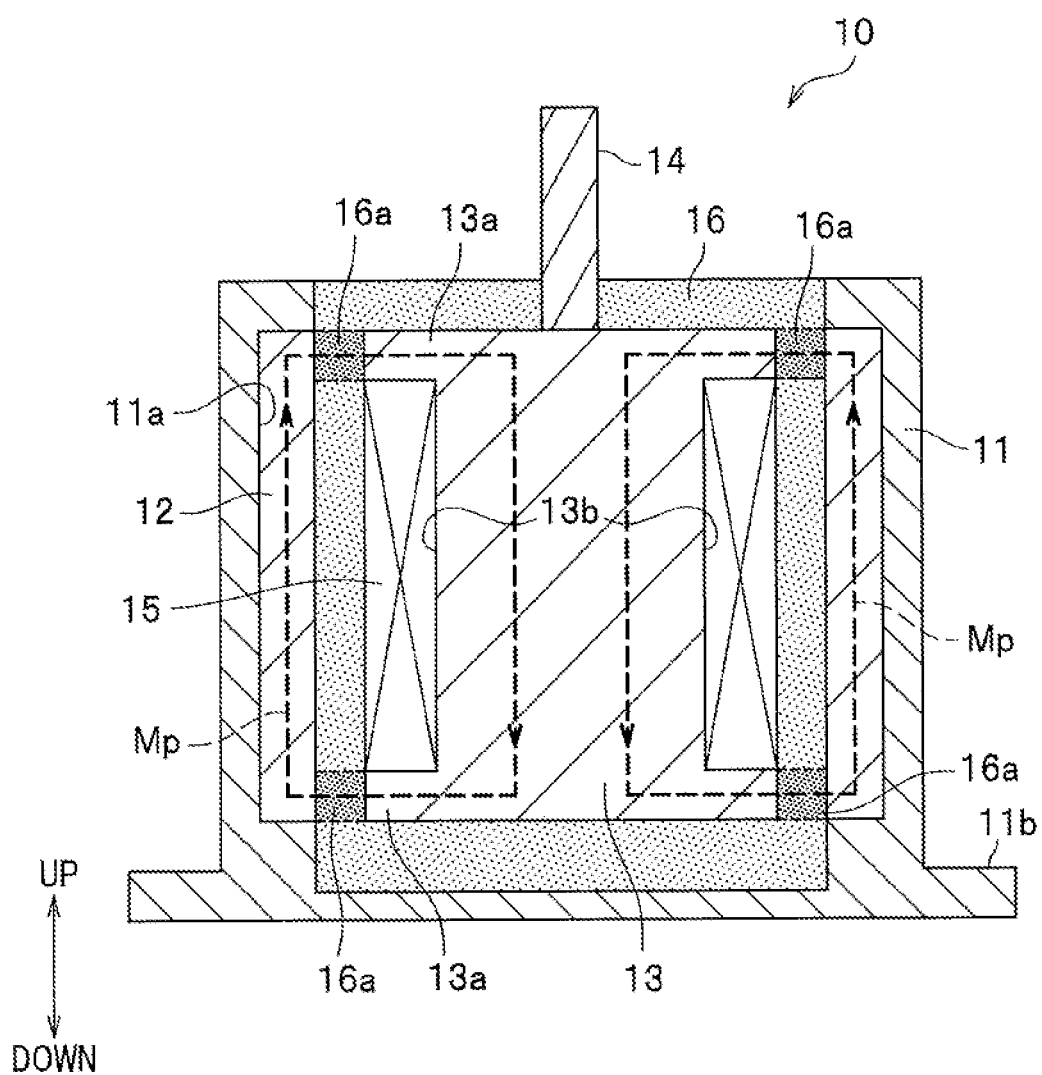
FIG. 2 is a longitudinal section view of a mount of the engine mount control apparatus.

FIG. 2 is a longitudinal section view of each mount 10 of the engine mount control apparatus 1.

As shown in FIG. 2, the mount 10 is provided with the housing 11, an outer core 12, an inner core 13, the shaft member 14, an electromagnetic coil 15, and a magneto-rheological elastomer (MRE) 16.

The housing 11 of this embodiment is formed as a bottomed, substantially cylindrical body having an upper opening.

The following describes the accommodating section 11a formed on the inner circumference side of the housing 11 of the outer core 12.

This accommodating section 11a is formed as a circumferential groove on the inner circumference side of the housing 11 so as to fit for the cylindrical outer core 12. Specifically, the groove width (vertical width) of the accommodating section 11a is set to the height of the outer core 12 and the groove depth of the accommodating section 11a is set to the thickness of the outer core 12. As such, the inside of the housing 11 with the outer core 12 arranged has a cylindrical space. In this cylindrical space, the below-described inner core 13, the electromagnetic coil 15, and the magneto-rheological elastomer 16 are arranged.

In addition, the bottom end of the substantially cylindrical housing 11 has a radially outwardly protruding flange portion 11b.

Examples of a material for the housing 11 of this embodiment include metals. Among them, preferred are non-magnetic metals such as aluminum alloy and stainless steel.

As described above, the outer core 12 of this embodiment has a cylindrical shape.

A material for the outer core 12 is not particularly limited as long as the below-described magnetic path Mp (see FIG. 2) is formed therein when a magnetic field is generated by the below-described electromagnetic coil 15. Examples include magnetic materials such as iron. Note that the outer core 12 of this embodiment is assumed to be cylindrical as described above. However, the shape is not limited to a cylindrical shape as long as the shape is tubular so that the below-described inner core 13 can be arranged inside thereof.

In addition, the outer core 12 may be composed of a plurality of core pieces that are divided along the circumferential direction.

The inner core 13 of this embodiment has radially outwardly protruding flange portions 13a on both ends of a cylindrical trunk and is shaped like a bobbin. A wire (not shown) is wound on the trunk around an axis of the trunk by winding (not shown) to form the below-described electromagnetic coil 15. That is, the inner core 13 has a circumferential groove 13b that fits for the electromagnetic coil 15 on the outer circumferential surface of the cylindrical body.

A material for the inner core 13 is not particularly limited as long as the below-described magnetic path Mp (see FIG. 2) can be formed therein when a magnetic field is generated by the below-described electromagnetic coil 15. Examples include magnetic materials such as iron.

The maximum outer diameter of the inner core 13 is set to a diameter smaller than the inner diameter of the cylindrical space that is inside the housing 11 with the above outer core 12 arranged.

The inner core 13 is arranged inside such an outer core 12 coaxitally. The outer circumference surface of each flange of the inner core 13, at which the diameter is maximum, faces the inner circumference surface of the outer core 12. A face-to-face section between the outer core 12 and a portion of this inner core 13, at which the diameter is maximum, has the shortest distance between the inner core 13 and the outer core 12, so that a magnetic path Mp is formed when a magnetic field is generated by the electromagnetic coil 15.

The shaft member 14 is connected to the upper end surface of the inner core 13 coaxially with the inner core 13. This shaft member 14 extends and protrudes outside the outer core 12. This shaft member 14 is supported on the engine E side as described above and vibrations are input therethrough to the inner core 13.

A material for this shaft member 14 is not particularly limited as long as, the material has a predetermined strength and can be bonded to the inner core 13. Examples of a method for bonding the inner core 13 and the shaft member 14 include, but are not limited to, welding, shrink fitting, and serration.

Note that the inner core 13 of this embodiment is assumed to be substantially cylindrical (shaped like a bobbin) as described above. However, the shape is not limited to a substantially cylindrical shape as long as the shape is columnar and the electromagnetic coil 15 can thus be arranged around it.

The electromagnetic coil 15 is configured such that a magnetic field can be applied to the magneto-rheological elastomer 16. The trunk of the inner core 13 is wound around an axis thereof by winding (not shown) to form the electromagnetic coil 15 as described above.

As shown in FIG. 2, a current is applied to this electromagnetic coil 15 to form a magnetic path Mp in the outer core 12, the inner core 13, and the below-described magnetic path-forming portions 16a of the magneto-rheological elastomer 16.

Next, the magneto-rheological elastomer 16 is explained.

As described above, a space between the outer core 12 and the inner core 13 that are arranged in the housing 11 is filled with the magneto-rheological elastomer 16. Specifically, as described in detail below, when the inner core 13 and the electromagnetic coil 15 are arranged inside the housing 11 in which the outer core 12 is arranged, a space formed between the outer core 12 and the inner core 13, which space excludes the electromagnetic coil 15, is filled with the magneto-rheological elastomer 16. That is, the magneto-rheological elastomer 16 is used to connect, by the below-described vulcanization bonding, the outer core 12 and the inner core 13 via the electromagnetic coil 15.

The magneto-viscoelastic elastomer 16 includes: a substrate elastomer having viscoelasticity as a matrix; and magnetic particles included in the substrate elastomer.

The substrate elastomer is not particularly limited as long as, for example, an uncured elastomer raw material has fluidity and can be an elastomer by vulcanization (cross-linking). Publicly known ones may be used. Specific examples of the substrate elastomer include, but are not limited to, urethane rubber and silicone rubber. Publicly known rubber polymer materials having viscoelasticity at room temperature may be used.

In addition, the substrate elastomer may contain, as needed, for instance, liquid rubber, such as terminal carboxyl-modified butadiene-acrylonitrile rubber or epoxy-modified butadiene-acrylonitrile rubber, and/or an elasticity modifier such as another oil component. Note that regarding a cross-linker (vulcanizer) and the heating temperature at which the elastomer raw material is cured, publicly known conditions are applicable depending on the kinds of the substrate elastomer selected. Also note that it is possible to use an elastomer raw material of shrinkage type that can be cured after moisture in the air is absorbed. Here, this elastomer raw material can be used without a cross-linker.

Examples of the magnetic particles include: but are not limited to, metals such as pure iron, electromagnetic soft iron, oriented silicon steel, Mn—Zn ferrite, Ni—Zn ferrite, magnetite, cobalt, and nickel; organic compounds such as 4-methoxybenzylidene-4-acetoxyaniline and a triaminobenzene polymer; and organic-inorganic composites such as a ferrite-dispersed anisotropic plastic. It is possible to use particles composed of publicly known materials characterized by magnetic polarization due to a magnetic field effect.

Examples of the shape of the magnetic particles include, but are not particularly limited to, a sphere shape, a needle shape, and a plate shape. The particle size of the magnetic particles is not particularly limited, but the average particle size should be about 0.01 μm to 500 μm, which size distribution is measured by, for instance, laser diffraction/scattering.

The percentage of the magnetic particles in the magneto-rheological elastomer 16 can be optionally set. Then, the whole magneto-rheological elastomer 16 including the magnetic path-forming portions 16a and the other portions should have an average volume percentage of about 5% to 60%. In addition, the percentage of the substrate elastomer in the magneto-rheological elastomer 16 can be optionally set. Then, the volume percentage should be about 40% to 95%.

As shown in FIG. 2, each magnetic path-forming portion 16a is formed at a face-to-face section in which a magnetic path Mp is formed and which is between the outer core 12 and the inner core 13. This face-to-face section is formed at a protruding portion that protrudes from either one of the outer core 12 and the inner core 13 toward the other. In this regard, however, in the mount 10 shown in FIG. 2, a protruding portion is formed at each flange portion 13a. This protruding portion is not particularly limited as long as the portion protrudes from either one of the outer core 12 and the inner core 13 toward the other. As described below, for instance, it can be configured such that a protruding portion 12b (see FIG. 6) protrudes from the bottom portion of the outer core 12a (see FIG. 6) toward a lower end surface 13c of the inner core 13 (see FIG. 6).

Each magnetic path-forming portion 16a of the magneto-rheological elastomer 16 has a higher content rate of the magnetic particles than a portion other than each magnetic path-forming portion 16a of the magneto-rheological elastomer 16.

In addition, use of the substrate elastomer having a lower hardness (rigidity) may increase mobility of the magnetic particles in each magnetic path-forming portion 16a. This together further increases the magnitude of change width in elastic modulus in each magnetic path-forming portion 16a.

Note that in FIG. 2, the magneto-rheological elastomer 16 is depicted as a half-tone dot meshing area and the magnetic path-forming portions 16a are depicted as darker hatching areas than those of portions other than the magnetic path-forming portions 16a.

Next, the control unit 20, as shown in FIG. 1, is explained.

The control unit 20 is configured to change the elastic modulus of each magnetic path-forming portion 16a of the magneto-rheological elastomer 16 in accordance with the magnitude of vibrations input via the shaft member 14 (see FIG. 2) into the inner core 13. This causes a change in the rigidity of each magnetic path-forming portion 16*a*.

As shown in FIG. 1, the control unit 20 of this embodiment includes an engine rotation speed sensor 21, an ECU 22, and a PDU 23.

The engine rotation speed sensor 21 of this embodiment is arranged near a flywheel (not shown) and is supposed to detect the engine E rotation speed by using a flywheel starter gear. Here, the engine rotation speed sensor 21 is not particularly limited as long as the engine E rotation speed can be detected.

The ECU 22 is an electronic unit composed of a CPU (Central Processing Unit), a memory, and others. The ECU 22 executes, by the CPU, a control program stored in a memory section such as a memory.

The ECU 22 uses the engine rotation speed sensor 21 to detect the engine rotation speed. In addition, the ECU 22 also uses the detected engine rotation speed to calculate the magnitude of vibrations input into the shaft member 14 of each mount 10. This calculation is executed such that the CPU accesses the memory having a map in which the relationship between the engine rotation speed and the magnitude of vibrations of the engine E is predetermined.

Further, the ECU 22 calculates the rigidity required for the magneto-rheological elastomer 16 (magnetic path-forming portion 16*a*) in accordance with the magnitude of vibrations calculated. This calculation is executed such that the CPU accesses the memory having a map in which the relationship between the magnitude of vibrations calculated and the rigidity such as shaft rigidity, bending rigidity, shearing rigidity, and torsional rigidity is predetermined.

Furthermore, the ECU 22 calculates a current value applied to the electromagnetic coil 15 and required to give a predetermined rigidity to the magneto-rheological elastomer 16 (magnetic path-forming portion 16*a*). This calculation is executed such that the CPU accesses the memory having a map in which the relationship between the rigidity of the magneto-rheological elastomer 16 (magnetic path-forming portion 16*a*) and the current value applied to the electromagnetic coil 15 is predetermined.

Moreover, the maps used by the ECU 22 are not limited to the above-described ones as long as the current value applied to the electromagnetic coil 15 can be calculated on the basis of the engine rotation speed.

FIG. 3 is a graph showing an example of the map stored in the memory of the control unit 20 (ECU 22) of the engine mount control apparatus 1 according to this embodiment.

As shown in FIG. 3, this map illustrates a predetermined relationship between the engine rotation speed $R_x$ (variable) and the current value $I_y$ (variable) applied to the electromagnetic coil 15. Here, the correlation between the rigidity of the magneto-rheological elastomer 16 and the $I_y$ is omitted. Such a map can be used to increase a rate of response to an input of the control unit 20.

The PDU 23 is composed of an electric circuit including, for instance, an inverter. The PDU 23 responds to a command of the ECU 22 and then applies a current from a power source (e.g., a battery) to the electromagnetic coil 15.

The following describes the operation and advantageous effects exerted by the engine mount control apparatus 1 of this embodiment.

FIG. 4 is a flowchart describing how the engine mount control apparatus 1 works.

In the engine mount control apparatus 1 (see FIG. 1) of this embodiment, when and after the engine E (see FIG. 1) is started, the ECU 22 (see FIG. 1) detects the engine rotation speed (at step S1 of FIG. 4) based on a detection signal from the engine rotation speed sensor 21 (see FIG. 1).

In the engine mount control apparatus 1, the magnitude of vibrations input via the shaft member 14 (see FIG. 1) into the inner core 13 is calculated (see step S2 of FIG. 4) on the basis of the numerical value of the engine rotation speed detected. As described above, the ECU 22 also calculates the elastic modulus of the magneto-rheological elastomer 16 (magnetic path-forming portion 16*a*), which elastic modulus is required for damping the input vibrations.

Next, the ECU 22 calculates (see step S3 of FIG. 4) a current value applied to the electromagnetic coil 15 (see FIG. 1) and required to give the calculated elastic force to the magneto-rheological elastomer 16 (magnetic path-forming portion 16*a*). Then, the ECU 22 commands the PDU 23 (see FIG. 1) to apply this current value to the electromagnetic coil 15.

The PDU 23 is based on the command from the ECU 22 to apply the current value from a given power source (not shown) to the electromagnetic coil 15, thereby forming a magnetic field. This gives the predetermined elastic modulus to the magneto-rheological elastomer member 16 (magnetic path-forming portion 16*a*) (see step S4 of FIG. 4).

In the engine mount control apparatus 1, the predetermined elastic modulus is given to each magneto-rheological elastomer member 16 (magnetic path-forming portion 16*a*) in accordance with the input vibrations, thereby efficiently damping the input vibrations.

In the above engine mount control apparatus 1 of this embodiment, the space between the outer core 12 and the inner core 13 that are disposed in the housing 11 is filled with the magneto-rheological elastomer 16. This enables the active noise vibration control apparatus 1 to maintain good static load support performance while the magneto-rheological elastomer 16 containing a substrate elastomer having a reliably large elastic changing rate and a low hardness (rigidity) can be used therefor.

In addition, because each magnetic path-forming portion 16*a* of the magneto-rheological elastomer 16 in the engine mount control apparatus 1 contains a larger number of magnetic particles, this magnetic path-forming portion 16*a* is given a locally larger rigidity when a magnetic field is formed by the electromagnetic coil 15. This permits the engine mount control apparatus 1 to exert an excellent damping effect on the input vibrations.

Also, a portion other than each magnetic path-forming portion 16*a* of the magneto-rheological elastomer 16 is inside the housing 11, so that the maintenance of good static load support performance is enabled in the engine mount control apparatus 1.

(Method of Manufacturing Engine Mount Control Apparatus)

The following describes a method for manufacturing the engine mount control apparatus 1 according to this embodiment.

FIGS. 5A to 5C are diagrams illustrating the steps of a method for manufacturing the engine mount control apparatus 1 according to this embodiment. Note that FIGS. 5A to 5C illustrate the steps of manufacturing the mount 10 during the manufacturing of the engine mount control apparatus 1.

The method for manufacturing the engine mount control apparatus 1 according to this embodiment is mainly characterized by injecting an elastomer raw material into the housing 11 having the outer core 12, the inner core 13, and the electromagnetic coil 15 at prescribed positions and by curing the elastomer raw material while a magnetic field generated by the electromagnetic coil 15 is applied to the elastomer raw material.

In this manufacturing method, as shown in FIG. 5A, the outer core 12, the inner core 13, and the electromagnetic coil 15 are arranged at prescribed positions inside the housing 11. At that time, a separation space 17 is formed between the outer core 12 and the inner core 13 while a portion of the electromagnetic coil 15 is excluded therefrom.

Next, in this manufacturing method, as shown in FIG. 5B, the above-described uncured elastomer raw material 18 is injected into the separation space 17 (see FIG. 5A). Accordingly, the space between the outer core 12 and the inner core 13 inside the housing 11, which space excludes the electromagnetic coil 15, is filled with the uncured elastomer raw material 18.

This uncured elastomer raw material 18 may contain, as described above, magnetic particles, a substrate elastomer-forming component, a cross-linker (vulcanizer), optionally added various additives, and others.

Next, in this manufacturing method, as shown in FIG. 5C, a magnetic field is formed by a current-applied electromagnetic coil 15 and a magnetic path Mp is formed at the above face-to-face section between the outer core 12 and the inner core 13. Then, in this manufacturing method, the elastomer raw material 18 (see FIG. 5B) is cured while the magnetic path Mp is formed so as to prepare the magneto-rheological elastomer 16.

Accordingly, the space between the outer core 12 and the inner core 13, which space excludes the electromagnetic coil 15, is filled with the magneto-rheological elastomer 16. Here, the elastomer raw material 18 is cured while the magnetic path Mp is formed. This can maintain a locally concentrated state of the magnetic particles included in the elastomer raw material 18 at each magnetic path-forming portion 16a of the magneto-rheological elastomer 16.

The control unit 20 is then attached to each mount 10 as obtained using such steps to produce the engine mount control apparatus 1 according to this embodiment.

Use of such a manufacturing method makes it possible to manufacture the above mount 10 having a large elastic changing rate in the magneto-rheological elastomer 16 by using simple steps.

In addition, according to such a manufacturing method, the manufacturing method can be simplified when compared with a method for separately preparing the magneto-rheological elastomer 16 and then assembling this elastomer and the outer core 12, the inner core 13, and the electromagnetic coil 15, etc., inside the housing 11.

Further, according to such a manufacturing method, the electromagnetic coil 15 for forming a magnetic field in the mount 10, which is a final product, can be used when each magnetic path-forming portion 16a, where the magnetic particles are concentrated, is prepared. This can simplify a manufacturing system for putting this manufacturing method into practice.

Furthermore, according to such a manufacturing method, the magnetic path Mp in the mount 10 as a final product is always the same as a portion (magnetic path-forming portion 16a) where the magnetic particles are concentrated during the manufacturing stage. Thus, this manufacturing method differs from, for instance, a method for separately preparing a magnetic particle concentration part and assembling this inside the housing 11. So, it is possible to omit the step of setting the position of the magnetic particle concentration part to the magnetic path Mp.

In the above manufacturing method, a prefabricated separate elastomer member (not shown) is arranged before an uncured elastomer raw material 18 is injected into the separation space 17, and the uncured elastomer raw material 18 may then be injected. Examples of the elastomer member include: but are not limited to, magneto-rheological elastomers in which content rate of magnetic particles is different from that of the magneto-rheological elastomer 16; and other materials such as rubber members. The examples include various functional members.

Hereinabove, the embodiment of the present invention has been illustrated. However, the present invention is not limited to it and can be variously modified without departing from the spirit of the present invention.

Figure 7:
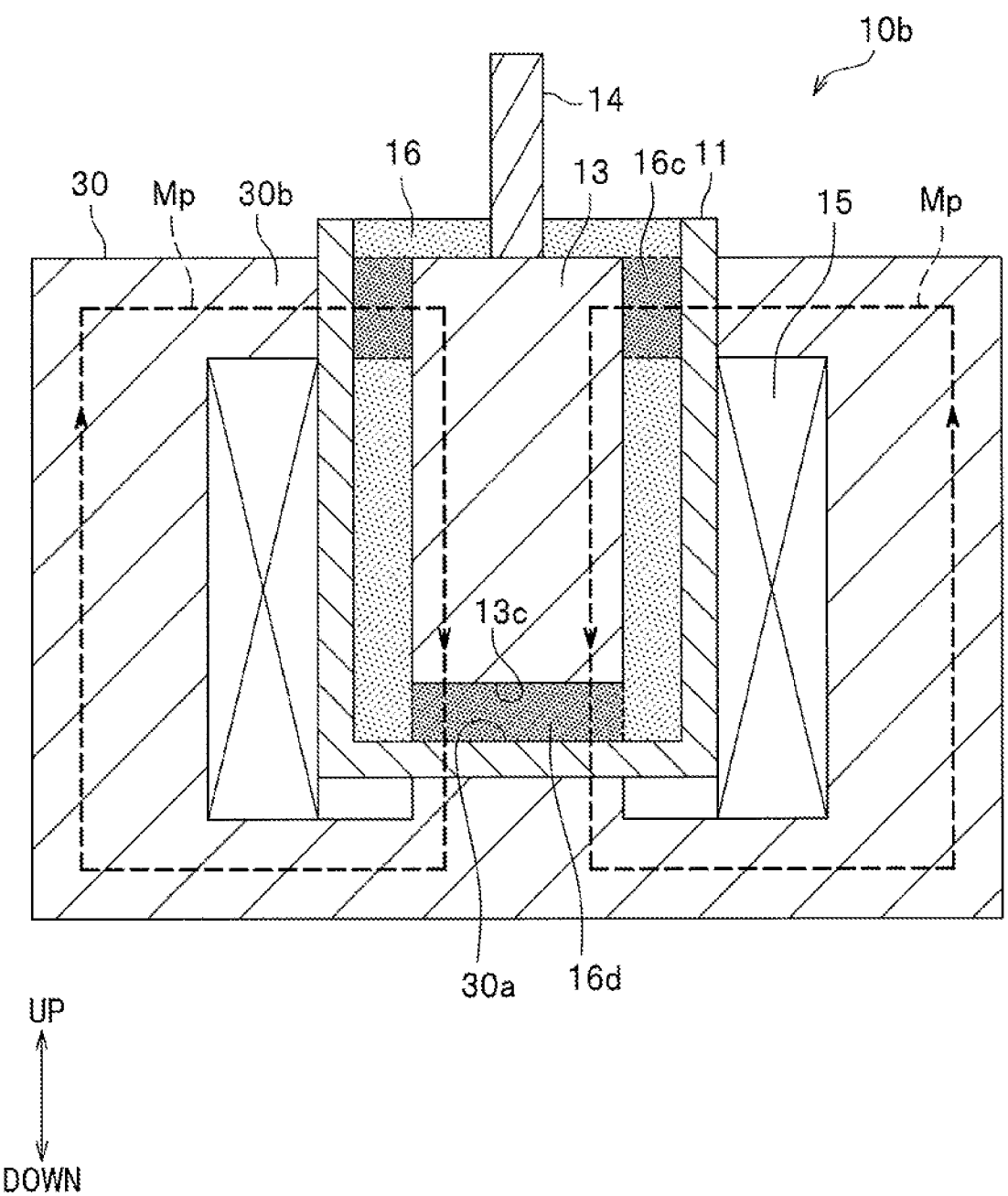
FIG. 7 is a diagram illustrating the configuration of a mount according to a second modification embodiment.
Figure 8A:
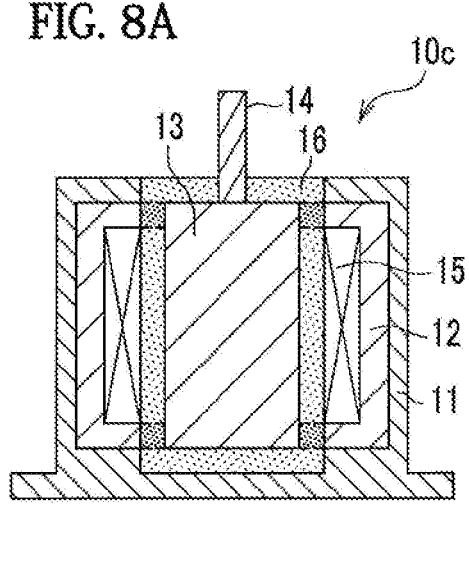
FIG. 8A is a diagram illustrating the configuration of a mount according to a third modification embodiment.
Figure 8B:
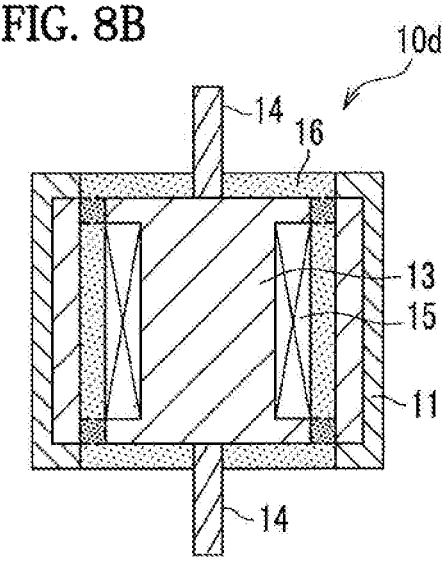
FIG. 8B is a diagram illustrating the configuration of a mount according to a fourth modification embodiment.
Figure 8C:
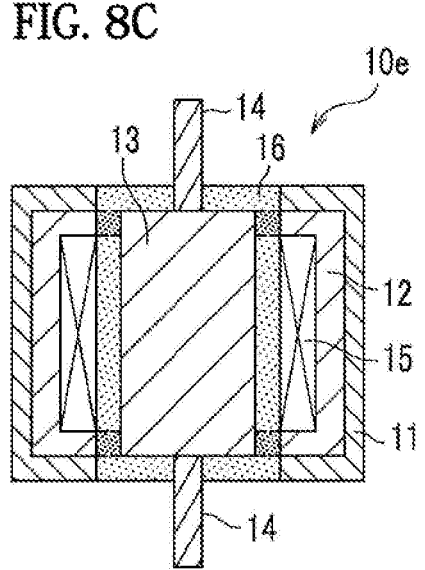
FIG. 8C is a diagram illustrating the configuration of a mount according to a fifth modification embodiment.
Figure 8D:
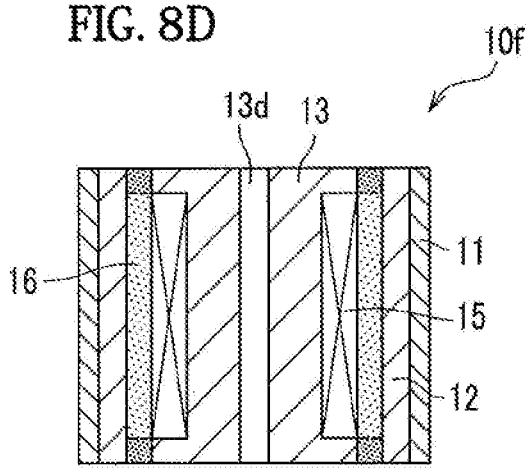
FIG. 8D is a diagram illustrating the configuration of a mount according to a sixth modification embodiment.
Figure 8E:
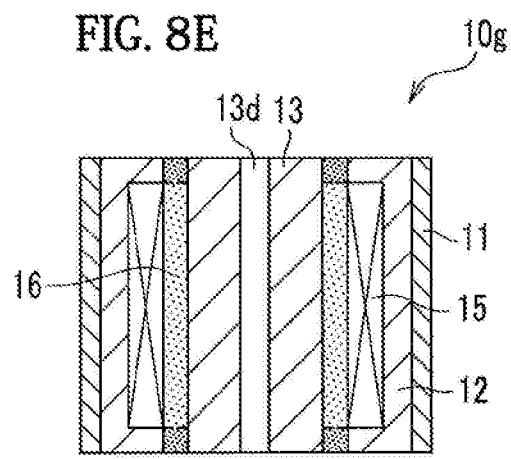
FIG. 8E is a diagram illustrating the configuration of a mount according to a seventh modification embodiment.

FIG. 6 is a diagram illustrating the configuration of a mount 10a according to a first modification embodiment of the above embodiment. FIG. 7 is a diagram illustrating the configuration of a mount 10b according to a second modification embodiment of the above embodiment. FIG. 8A is a diagram illustrating the configuration of a mount 10c according to a third modification embodiment of the above embodiment; FIG. 8B is a diagram illustrating the configuration of a mount 10d according to a fourth modification embodiment of the above embodiment; FIG. 8C is a diagram illustrating the configuration of a mount 10e according to a fifth modification embodiment of the above embodiment; FIG. 8D is a diagram illustrating the configuration of a mount 10f according to a sixth modification embodiment of the above embodiment; and FIG. 8E is a diagram illustrating the configuration of a mount 10g according to a seventh modification embodiment of the above embodiment. Note that the components of the mount 10a of the first modification embodiment to the mount 10g of the seventh modification embodiment have the same reference sings as of the above embodiment so as to avoid redundancy in the detailed description.

As shown in FIG. 6, the mount 10a according to the first modification embodiment has a bottomed cylindrical outer core 12a, which differs from the outer core 12 (see FIG. 2) of the mount 10 (see FIG. 2) of the above embodiment.

In addition, the bottom portion of this outer core 12a has a protruding portion 12b that protrudes toward and faces a lower end surface 13c of the inner core 13.

It is possible to appropriately and freely set spacing between the protruding portion 12b and the lower end surface 13c and spacing between the outer core 12a and the flange portion 13a of the inner core 13. For instance, the spacing between the protruding portion 12b and the lower end surface 13c and the spacing between the outer core 12a and the flange portion 13a of the inner core 13 are equally set. Accordingly, in the mount 10a, a magnetic path-forming portion 16a is formed at a face-to-face section between the outer core 12a and the flange portion 13a of the inner core 13. At the same time, a magnetic path-forming portion 16b is formed between the protruding portion 12b of the outer core 12a and the lower end surface 13c of the inner core 13.

This magnetic path-forming portion 16b has a higher content rate of the magnetic particles than a portion other than the magnetic path-forming portion 16b and the magnetic path-forming portion 16a of the magneto-rheological elastomer 16. Thus, like the magnetic path-forming portion 16a, this magnetic path-forming portion 16b has a markedly larger elastic changing rate than the other portions of the magneto-rheological elastomer 16 when a magnetic field is generated by the electromagnetic coil 15.

According to the mount 10a of the first modification embodiment, vibrations V1 (see FIG. 6) input in the shaft direction of the shaft member 14 are damped primarily by the magnetic path-forming portion 16a; and vibrations V2 (see FIG. 6) input in a direction intersecting the shaft direction of the shaft member 14 are damped primarily by the magnetic path-forming portion 16b. That is, this is because the magnetic particles are oriented along a magnetic flux line (not shown) in the magnetic path-forming portion 16a or 16b; and the vibrations acting in a shear force direction that intersects the magnetic flux line in the magnetic path-forming portion 16a or 16b are damped efficiently. In this regard, the direction of the magnetic flux line is the same as the direction of the magnetic path Mp.

In addition, it is needless to say that the magnetic path-forming portions 16a and 16b also each have a function of damping vibrations in a direction along the magnetic flux line while the damping performance is poorer than the damping performance in a direction intersecting the magnetic flux line. Besides, both the magnetic path-forming portions 16a and 16b serve to efficiently damp torsional vibrations of the shaft member 14.

As shown in FIG. 7, the mount 10b according to the second modification embodiment differs from the mount 10 (see FIG. 2) of the above embodiment, and the housing 11 has an outer core 30 outside thereof. Meanwhile, the mount 10 (see FIG. 2) of the above embodiment has both the outer core 12 and the inner core 13 inside the housing 11. In contrast, the mount 10b according to the second modification embodiment as shown in FIG. 7 has only the inner core 13 inside the housing 11. This point is also a difference. Provided that as shown in FIG. 7, in the mount 10b according to the second modification embodiment, a space between the housing 11 and the inner core 13 inside the housing 11 is filled with the magneto-rheological elastomer 16. This point is shared with the mount 10 (see FIG. 2) of the above embodiment.

In addition, in the mount 10b according to the second modification embodiment, a magnetic path-forming portion 16c is formed at a face-to-face section between the inner core 13 and a flange portion 30b of the outer core 30. Also, in the mount 10b according to the second modification embodiment, a magnetic path-forming portion 16d is formed at a face-to-face section between a protruding portion 30a of the outer core 30 and a lower end surface 13c of the inner core 13. That is, the mount 10b according to the second modification embodiment has the magnetic path-forming portions 16c and 16d where the magnetic particles are concentrated. This point is shared with the mount 10 (see FIG. 2) having each magnetic path-forming portion 16a of the above embodiment and the mount 10a (FIG. 6) having the magnetic path-forming portion 16a and the magnetic path-forming portion 16b of the first modification embodiment.

Such a mount 10b according to the second modification embodiment enables the maintenance of good static load support performance and makes it possible to retain a large elastic changing rate in the magneto-rheological elastomer 16.

Such a mount 10b according to the second modification embodiment can be manufactured by the above manufacturing method.

As shown in FIGS. 8A to 8E, the mount 10c according to the third modification embodiment has the electromagnetic coil 15 on the outer core 12 side, which differs from the electromagnetic coil 15 disposed on the inner core 13 side (see FIG. 2) of the mount 10 (see FIG. 2) according to the above embodiment.

In the mount 10c according to the third modification embodiment, the electromagnetic coil 15 is disposed not on the inner core 13, which receives vibrations, but on the outer core 12, which is on a stationary side. Consequently, the strength of electrical contacts with the electromagnetic coil 15 can be set in a usual manner.

As shown in FIG. 8B, the mount 10d according to the fourth modification embodiment differs from the mount 10 (see FIG. 2) of the above embodiment, and both end surfaces in the shaft direction of the inner core 13 are each provided with the shaft member 14.

In this mount 10d according to the fourth modification embodiment, vibrations are input thorough each of the shaft members 14 and 14. Thus, the mount 10d are arranged, for instance, at an intermediate position between vibrating rod-like members.

As shown in FIG. 8C, the mount 10e according to the fifth modification embodiment has the electromagnetic coil 15 on the outer core 12 side, which differs from the mount 10d according to the above fourth modification embodiment.

In the mount 10e according to the fifth modification embodiment, the electromagnetic coil 15 is disposed on the outer core 12, which is on a stationary side. Consequently, the strength of electrical contacts with the electromagnetic coil 15 can be set in a usual manner.

As shown in FIG. 8D, the mount 10f according to the sixth modification embodiment differs from the mount 10 (see FIG. 2) of the above embodiment, and a center hole 13d, instead of the shaft member 14 (see FIG. 2), is formed in the inner core 13.

In the mount 10f according to the sixth modification embodiment, a rod-like member, for instance, is inserted into the center hole 13d and the housing 11 is supported by a given support part when used.

In this mount 10f according to the sixth modification embodiment, it is possible to damp vibrations occurring through at least one of the rod-like member and the support part.

In addition, like the mount 10g according to the seventh modification embodiment as shown in FIG. 8E, the electromagnetic coil 15 of the mount 10f may be arranged on the outer core. 12 side.

Collectively, as shown in the mounts 10c to 10g of FIG. 8A to FIG. 8E, the electromagnetic coil 15 may be disposed on the outer core 12 or the inner core 13, which can increase the degree of design freedom.

REFERENCE SIGNS LIST

1 Engine mount control apparatus (Active noise vibration control apparatus)
10 Mount
10a Mount
10b Mount
10c Mount
10d Mount
10e Mount
10f Mount
10g Mount
11 Housing
12 Outer core
12a Outer core
13 Inner core
14 Shaft member
Electromagnetic coil
16 Magneto-rheological elastomer
16a Magnetic path-forming portion 16b Magnetic path-forming portion
16c Magnetic path-forming portion
16d Magnetic path-forming portion
17 Separation space
18 Elastomer raw material
20 Control unit
21 Engine rotation speed sensor
22 ECU
23 PDU
30 Outer core
30b Flange portion
30b Protruding portion
E Engine
F Vehicle body frame
Mp Magnetic path

The invention claimed is:

1. An active noise vibration control apparatus comprising:
a housing that has an outer core;
an inner core that is disposed inside the outer core; and
an electromagnetic coil that is positioned between the outer core and the inner core,
wherein a space between the outer core and the inner core is filled with a magneto-rheological elastomer containing magnetic particles; and
a content rate of the magnetic particles in a magnetic path-forming portion of the magneto-rheological elastomer between the outer core and the inner core is higher than a content rate of the magnetic particles in a portion other than the magnetic path-forming portion of the magneto-rheological elastomer.

2. The active noise vibration control apparatus according to claim 1, wherein the electromagnetic coil is disposed on the outer core side and is arranged apart from the inner core.

3. The active noise vibration control apparatus according to claim 1, wherein the electromagnetic coil is disposed on the inner core side and is arranged apart from the outer core.

4. The active noise vibration control apparatus according to claim 1, wherein the magnetic path-forming portion is formed at a face-to-face section that is between the outer core and the inner core and is at a protruding portion where either one of the outer core and the inner core protrudes toward the other.

5. The active noise vibration control apparatus according to claim 4, wherein the inner core having a cylindrical columnar shape is arranged on an inner circumference side of the outer core having a cylindrical tubular shape; and
the protruding portion protrudes from either one of the inner circumference side of the outer core and an outer circumferential side of the inner core toward the other.

6. The active noise vibration control apparatus according to claim 5, wherein the protruding portion is a flange formed on each of both end portions in an axial direction of the inner core.

7. The active noise vibration control apparatus according to claim 6, wherein the electromagnetic coil wound around the inner core is housed between the flanges of the both end portions.

8. The active noise vibration control apparatus according to claim 4, wherein the inner core having a cylindrical columnar shape is arranged on an inner circumference side of the outer core having a bottomed cylindrical tubular shape; and
the protruding portion protrudes from a bottom portion of the outer core toward the inner core.

9. A method for manufacturing an active noise vibration control apparatus, comprising:
an arrangement step of arranging an inner core inside an outer core of a housing having the outer core and arranging an electromagnetic coil between the outer core and the inner core;
an injection step of injecting a magnetic particle-containing uncured elastomer raw material containing magnetic particles into a separation space formed, inside the housing, between the outer core and the inner core; and
a magneto-rheological-elastomer formation step of curing the elastomer raw material while forming a given magnetic path in the outer core, the inner core, and the injected elastomer raw material by applying a current to the electromagnetic coil such that a content rate of the magnetic particles in a magnetic path-forming portion of the magneto-rheological elastomer between the outer core and the inner core is higher than a content rate of the magnetic particles in a portion other than the magnetic path-forming portion of the magneto-rheological elastomer.

* * * * *